Patented Feb. 15, 1927.

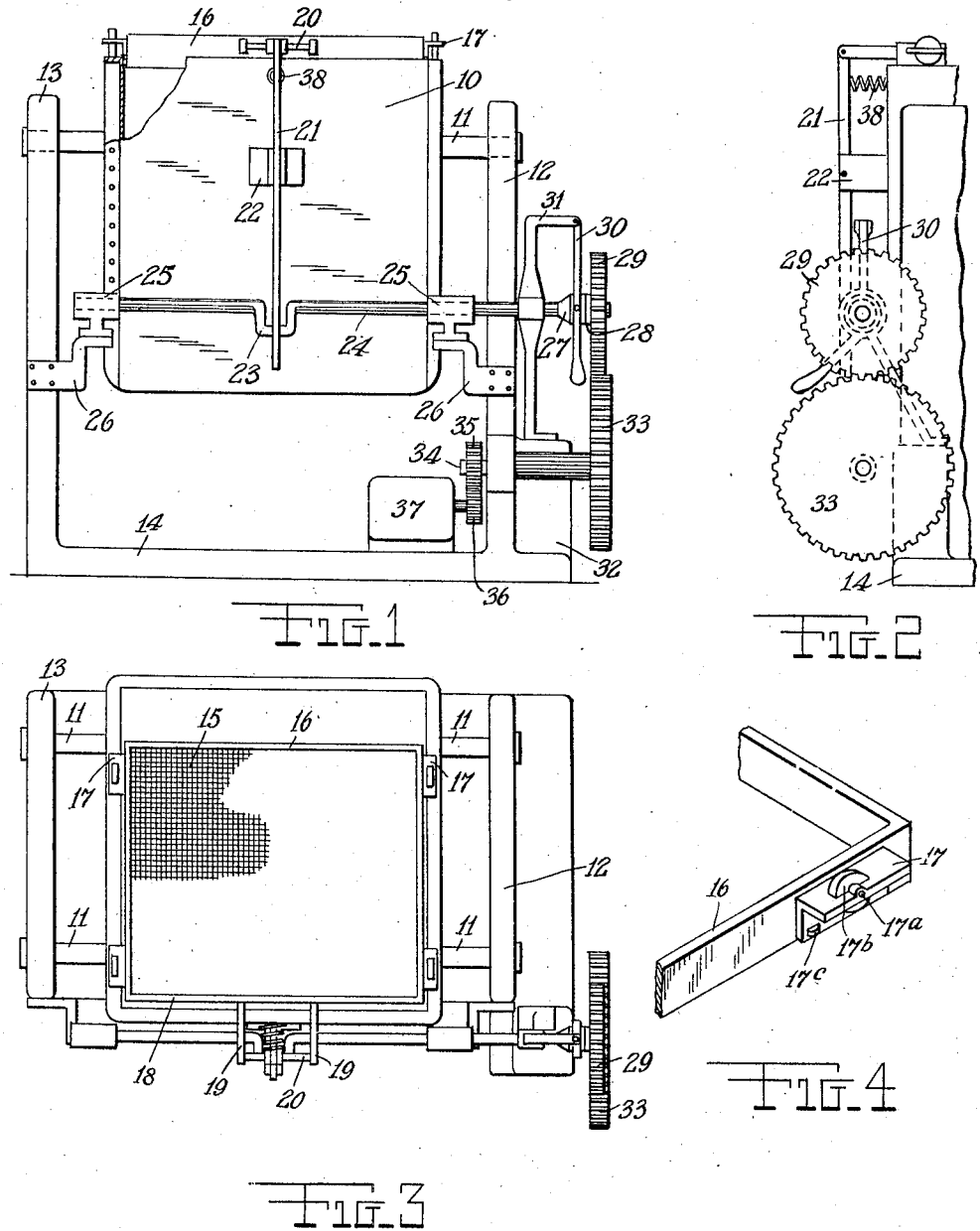

1,617,797

UNITED STATES PATENT OFFICE.

ANTONIO DI LORENZO, OF ASTORIA, NEW YORK.

FLOUR SIFTER.

Application filed July 9, 1925. Serial No. 42,376.

The main object of this invention is to provide a device by which flour may be mechanically sifted. Usually, flour is sifted by holding a screen and manually agitating the same, which causes the user to become tired and also does not give a thorough sifting as the user does not constantly agitate the sifter in the same even manner. To improve this method of sifting flour, I propose to construct a sifting sieve which is mounted upon and above a dough mixing trough and is mechanically agitated by a lever bar.

The above and other objects will become apparent in the description below, in which characters of reference refer to like-named parts in the drawing.

Referring briefly to the drawing, Figure 1 is a front elevational view of the sifting device.

Figure 2 is a partial side elevational view of the same.

Figure 3 is a top plan view of Figure 1.

Figure 4 is a perspective view of a corner of the sieve, showing the supporting elements.

Referring in detail to the drawing, the numeral 10 indicates a dough mixing trough. This dough mixing trough is supported by laterally extending studs 11 which are mounted upon standards 12 and 13, said standards projecting upwardly from a base or platen 14. This trough is adapted to have mixing machinery therein and is further adapted to receive flour, a partial ingredient of the dough. Before consigning the flour to the trough, the same is sifted thru a sieve consisting of a wire mesh 15 which is bounded by walls 16 forming a rectangular enclosure into which the flour is dumped. This sieve is provided with angle irons 17 near each corner. The angle irons have slots therein and pins 17$^a$ passing laterally thru these slots, on which pins, rollers 17$^b$ are supported. Below and to the side of the rollers 17$^b$, a recess is formed in the vertical portion of each angle iron and in this recess, relatively small rollers 17$^c$ are housed. The rollers 17$^b$ mounted on the angle irons 17 are near the corners of the sieve and are adapted to ride upon the upper surface of the dough mixing trough 10 and form a wheel support for the sieve, while the smaller rollers 17$^c$ are adapted to contact with the inner faces of the walls of the dough mixing trough so that no rubbing contact is had between the sieve and the dough mixing trough. From one of the sides 18 of the sieve, a pair of arms 19 extend. These arms are joined by a cross rod 20 on which the upper end of an agitator bar 21 is pivoted. The agitator bar is fulcrumed intermediate its length between brackets 22 which are mounted on the outer sides of one of the walls of the dough mixing trough 10. The lower end of the agitator bar is contacted by a crank 23 which forms part of a shaft 24, the latter being journalled in blocks 25, said blocks being supported on bases 26 which are attached to the sides of the standards 12 and 13. One end of the shaft 24 extends outwardly from one of the blocks 25 and has mounted thereon a longitudinally slidable clutch member 27 which engages a cooperating part of a clutch member 28 which is rigidly mounted on the face of a spur gear 29, said spur gear being loosely mounted upon the shaft 24. This clutch member 27 is moved longitudinally on the shaft 24 by a lever 30 which depends from a pedestal 31, the latter being mounted on a base 32. This spur gear 29 is driven by a larger gear 33 which is mounted on a shaft 34. The opposite end of the latter has a pinion 35 secured thereto which is in constant mesh with an additional pinion 36 mounted on the shaft of the motor 37.

In using this sifting device, the sieve is filled with flour. The motor 37 is then energized, causing the pinion 38 to rotate the pinion 35. The pinion 35 transmits rotation to the gear 33 which in turn rotates the gear 28. By manipulating the clutch lever 30 away from or toward the spur gear 29, the latter is locked or released from the shaft 24. As the shaft 24 is rotated, the crank rocks the agitator bar 21 about the fulcrum brackets 22 and causes a longitudinal reciprocal motion of the sieve, which is supported on a carriage consisting of the angle irons 17 and rollers 17$^b$. As the crank is mounted on one side of the agitator bar 21 between the dough mixing trough 10 and the agitator bar, a spring such as 38 may be provided between the dough mixing trough and the agitator bar in order to retain the lower end of the agitator bar in constant contact with the crank 23.

I claim:

A flour sifter comprising a sieve and a frame for said sieve adapted to be supported above a container having tracks on opposite sides, angle irons extending outwardly from the sides of said frame having opening in the form of longitudinal channels formed therein, rollers rotatably mounted in said channel extending below and above the angle iron, said angle irons having their vertical sides secured to said frame and their horizontal sides extending therefrom, the rollers being mounted in the horizontal sides, and additional rollers mounted in the vertical sides of the angle irons extending outwardly from the one side of the iron, the bottom of said frame extending below the track of the container, the periphery of said first-named rollers at the bottom being above the lower edge of the frame.

In testimony whereof I affix my signature.

ANTONIO DI LORENZO.